United States Patent [19]
Ohara et al.

[11] Patent Number: 6,127,513
[45] Date of Patent: Oct. 3, 2000

[54] SPHERICAL POLYAMIDE AND PROCESS FOR PREPARING THE SAME

[75] Inventors: Shinji Ohara; Yoshiro Iwata; Masahiko Emoto, all of Ube, Japan

[73] Assignee: Ube Industries, Ltd., Yamaguchi, Japan

[21] Appl. No.: 09/039,051

[22] Filed: Mar. 13, 1998

[30] Foreign Application Priority Data

Mar. 18, 1997 [JP] Japan ..................................... 9-064210
Feb. 20, 1998 [JP] Japan ................................... 10-038938

[51] Int. Cl.⁷ ............................. C08G 69/08; C08G 69/04
[52] U.S. Cl. .......................... 528/320; 528/310; 528/312; 528/323
[58] Field of Search ..................................... 528/310, 320, 528/323, 312

[56] References Cited

U.S. PATENT DOCUMENTS 3,476,711  11/1969  Muller .
3,909,498   9/1975  Wolvers et al. .
4,694,063   9/1987  Hilaire et al. ........................... 528/315
5,039,784   8/1991  Canalini .................................. 528/312
5,244,984   9/1993  Suzuki .

FOREIGN PATENT DOCUMENTS 0256323   2/1988   European Pat. Off. .
70029832  7/1967   Japan .

*Primary Examiner*—Fred Zitomer
*Attorney, Agent, or Firm*—Rodman and Rodman

[57] ABSTRACT

Disclosed is a process for preparing spherical polyamide having an average grain diameter of 100 μm or less which comprises polymerizing monomers for preparing the polyamide under heating at a temperature higher than the melting points of the monomers and the polyamide while melting the monomers in a polymerization medium under stirring whereby dispersing the formed polyamide with fine particles in the polymerization medium and then cooling the resulting mixture.

7 Claims, No Drawings

SPHERICAL POLYAMIDE AND PROCESS FOR PREPARING THE SAME

BACKGROUND OF THE INVENTION

This invention relates to a spherical polyamide and a process for preparing the same, more specifically to a spherical polyamide having good quality with a low cost and a process for preparing the same.

Polyamide resin powder has been widely used, in addition to the use of a binder for a plastic magnet and a material for uniformly disperse powder for preparing a master batch, as a powder coating such as an electrostatic coating and a fluidization dip coating, or as an adhesive base material or a hot melt adhesive. However, due to improvement in quality of the powder coating or development to new use, it has been desired to obtain a high quality polyamide resin sphere which is more round than the conventional one, has a grain diameter of 100 μm or less and has a relatively uniform grain size.

For the above purposes, it has been used a method in which a polyamide resin is previously dissolved in a rich solvent and then a poor solvent is added to the solution to precipitate fine powder or a method of chemically pulverizing a polyamide resin by utilizing difference in solubility depending the temperature of a solvent whereby a polyamide resin powder is produced and supplied to a market. However, its cost is high so that the use is limited. Also, there is a problem that many of the commercially available powder are porous state so that they are not uniform sphere. For obtaining an inexpensive polyamide resin powder, it has been carried out a method in which a melted polyamide resin is added dropwise onto a disc rotating with a high speed and scattering it to surroundings to obtain fine powder. However, even when this method is employed, the resulting powder has a porous bulk shape of lava and has a remarkably broad grain distribution so that the use thereof is limited. For example, when it is used as a cosmetic base material, shaving cream or a surfactant for artificial leathers which use high quality polyamide resin powder having more spherical than the conventional ones, small grain size and relatively uniform grain size, expensive chemically pulverized material should be used.

On the other hand, a method of obtaining a granular polyamide resin powder directly from a monomer has been known in Japanese Patent Publication No. 29832/1970, etc., which discloses a method of polymerizing monomers by dissolving them in a liquid substance at high temperature and polymerizing them by using an alkaline catalyst. However, according to this method, an extremely active substance such as metal sodium, etc. is used so that there is a serious problem of causing explosion or a fire. Also, it is difficult to remove impurities in the residue of the catalyst so that the method has not yet been used as a general method for polymerizing polyamide resin powder.

SUMMARY OF THE INVENTION

An object of this invention is to provide a process for preparing uniform spherical polyamide fine particles directly from a monomer with high efficiency and high productivity without requiring any complex post-treatment such as dissolving the polymer once formed, etc.

The present inventor has intensively studied to accomplish the above object and as the results, he has found that spherical polyamide fine particles can be obtained by dispersing monomers for preparing the polyamide in a liquid which is inactive and stable at a high temperature such as a silicone oil, etc., polymerizing under heating and then cooling, whereby accomplished the present invention.

That is, the present invention is a process for preparing spherical polyamide having an average grain diameter of 100 μm or less which comprises polymerizing a monomer for preparing the polyamide under heating at a temperature higher than the melting points of the monomer and the formed polyamide while melting the monomer in a polymerization medium under stirring whereby dispersing the formed polyamide with fine particles in the polymerization medium and then cooling the resulting mixture.

DESCRIPTION OF THE PREFERRED EMBODIMENTS

In the following, the present invention is explained in detail.

As the monomer to be used in the present invention for producing the spherical polyamide (hereinafter sometimes referred to as "polyamide monomer"), there may be mentioned, for example, an aminocarboxylic acid having 4 to 12 carbon atoms and a cyclic lactam having 4 to 12 carbon atoms singly or in admixture of two or more. Examples of the aminocarboxylic acid may include 4-aminobutanoic acid, 6-aminocaproic acid, 11-aminoundecanoic acid and 12-aminododecanoic acid, and examples of the cyclic lactam may include ε-caprolactam and ω-laurolactam, preferably 4-aminobutanoic acid, 6-aminocaproic acid, 11-aminouidecanoic acid and 12-aminododecanoic acid. Of these, particularly preferred compounds are 6-aminocaproic acid and 12-aminododecanoic acid. These monomers can be used alone or in combination of two or more. Also, other monomer which does not inhibit polymerization of the above monomer may be added preferably in an amount of 15% by weight or less, more preferably 10% by weight or less based on the total weight of the monomers.

A concentration of the starting monomer to be charged is usually 50% by weight or less, more preferably 20% by weight or less, further preferably 15% by weight or less based on the total weight of the reaction system including the monomer an a polymerization medium. If the amount exceeds 50% by weight, the formed polyamide cannot sufficiently nor uniformly be dispersed in the polymerization medium and formation of spherical polyamide fine particles having an average diameter of 100 μm or less becomes difficult.

As the polymerization medium to be used in the present invention, there may be used those which do not dissolve the formed polyamide, have a high boiling point, do not affect to the polymerization reaction and are relatively chemically stable. For example, there may be mentioned a silicone oil, a liquid paraffin, polyethylene glycol, and preferably a silicone oil.

The silicone oil may include polydimethylsiloxane methylphenylpolysiloxane, etc. and an alkyl modified product, an amino modified product, a fluorine modified product and a polyether modified product of the above materials may be also mentioned, and preferably polydimethylsiloxane.

To prepare fine particles, it is preferred to use a polymerization medium having a suitable viscosity in order to transmit stirring motive power to a dispersed or melted monomer or a formed polyamide in the polymerization medium sufficiently. Examples of the polymerization medium may include those preferably having a viscosity measured according to JIS Z-8803:91 of 100 cps/25° C. or more, more preferably 1,000 cps/25° C. or more, further preferably 10,000 cps/25° C. or more. If the viscosity is less than 100 cps/25° C., the formed polyamide resin tends to be adhered to the wall surface of the reaction vessel or bulky polyamide resin tends to be occurred.

In order to obtain the aimed spherical polyamide with good efficiency, it is preferred to disperse a starting monomer in a polymerization medium uniformly as a pretreatment for performing the polymerization reaction.

The temperature when dispersing a starting monomer in a polymerization medium is not particularly limited so long as the monomer can be uniformly dispersed, but it is preferred to sufficiently stir the monomer at the melting point or lower of the same.

The polymerization temperature may vary depending on the kinds of the polyamide monomer and the formed polyamide, but it is necessary to set the temperature higher than the melting points of these materials. By setting the temperature as mentioned above, the polyamide monomer is melted by heating and the polymerization proceeds to give a polyamide. However, depending on the characteristics of the polymerization medium to be used, the upper limit of the polymerization temperature is limited and it is not preferred to perform the polymerization at a temperature at which the polymerization medium is deteriorated. The polymerization temperature is generally 320° C. or lower, preferably 280° C. or lower, more preferably in the range of 230° C. or lower, and the lower limit is preferably a melting point of the monomer or higher.

To obtain fine particles having an average particle size of 100 $\mu$m or less, it is particularly preferred to select the stirring conditions such as a shape of an agitating blade and a stirring rate suitably.

For example, in order to stir the polymerization reaction mixture sufficiently, a motor driving type stirring apparatus generally used can be employed. The agitating blade may include propeller blade, paddle blade, turbine blade, screw blade, helical ribbon blade, anchor blade, etc. Depending on necessity, baffle or turning blade, or an agitating blade having a specific shape may be used. At the step of melting and polymerizing a monomer to finely disperse a polyamide, a mechanical dispersing apparatus such as an emulsifier may be used for controlling the particle size of the forming polyamide. The emulsifier may include a homomixer, a reverse homomixer, a disper mixer, an ultra mixer, a high pressure homogenizer, an ultrasonic emulsifier, a pipeline mixer, etc.

The stirring rate may vary depending on the viscosity of the polymerization medium to be used, but it is not particularly limited so long as it is within a range that the monomer to be used and the formed polymer are sufficiently dispersed and the polymerization medium does not send spray flying through the air. When a stirring blade is used, it is generally 20 rpm to 3000 rpm, preferably 30 rpm to 2500 rpm, more preferably 50 to 2000 rpm.

If the stirring rate is too low, dispersion becomes insufficient so that the aimed spherical polyamide can hardly be obtained. On the other hand, it is to high, the polymerization medium is sent spray to the side wall of the reaction apparatus whereby the aimed spherical polyamide can difficultly be obtained.

The resulting polymerization reaction mixture is then cooled by allowing the whole dispersion system to stand or pouring into a solvent which does not dissolve the polyamide but dissolves the polymerization medium at room temperature in order to prevent agglomeration of particles. Thus, by cooling the resulting polyamide to a temperature lower than the melting point or softening point thereof, preferably lower than the glass transition point thereof, fine polyamide particles are solidified to obtain spherical polyamide particles having an average particle size of 100 $\mu$m or less.

Examples of the solvent which does not dissolve the polyamide but dissolves the polymerization medium may include an organic solvent having a boiling point of 40 to 200° C. including aromatic hydrocarbons such as toluene, xylene, etc.; aliphatic hydrocarbons such as n-hexane, n-octane, etc.; alicyclic hydrocarbons such as cyclohexane, cyclooctane, etc.; halogenated hydrocarbons such as trichloroethane, etc.; alcohols such as isopropyl alcohol, etc.; ketone such as methyl ethyl ketone, etc.; esters such as ethyl acetate, etc.

Then, separating operation such as filtration is carried out to isolate spherical polyamide particles in the polymerization medium.

At this time, if necessary, by washing said spherical polyamide particles by the above mentioned organic solvent, the polymerization medium can be completely removed from said spherical polyamide particles.

The polymerization degree of the polyamide can be easily controlled by the polymerization temperature and time and spherical polyamide particles with a desired polymerization degree from a low viscosity to a high viscosity can be obtained. That is, when the polymerization temperature is raised or the polymerization time is elongated, the polymerization degree of the resulting polyamide becomes large.

Depending on the required characteristics of the spherical polyamide particles, an additive may be added at polymerization in an amount which does not participate in the reaction. Examples of the additive may include a heat resistant agent, a weathering agent including an UV absorber, an antistatic agent, a lubricant, a plasticizer, a nucleating agent, a colorant, a stabilizer, an emulsifier, a dispersant, etc. Also, the polymerization reaction is preferably carried out in an inert gas atmosphere such as nitrogen, etc. in order to prevent oxidation since the reaction is carried out at high temperature.

The average particle size of the thus prepared spherical polyamide particles is 100 $\mu$m or less. When suitable polymerization conditions are selected, spherical polyamide particles having 50 $\mu$m or less, and further 20 $\mu$m or less can be obtained.

The spherical polyamide particles obtained by the present invention can be mainly used as a base material for cosmetics, shaving foam, body shampoo and a surfactant of artificial leathers.

EXAMPLES

In the following, the present invention is explained by referring to Examples, but is not limited by these Examples.

A relative viscosity was measured according to JIS K6810 by a 98% sulfuric acid method.

Example 1

In a 500 ml reaction vessel equipped with a condenser and a stirring apparatus were charged 20 g of powdery 12-aminododecanoic acid, and 200 g of polydimethyldiloxane (available from Toray Dow Corning Co., SH200-10000cs, trade name), and the mixture was stirred at room temperature to disperse the powdery 12-aminododecanoic acid powder well. Then, under nitrogen atmosphere and stirring, the mixture was heated at 220° C. for 2 hours to polymerize 12-aminododecanoic acid whereby a sufficiently dispersed polyamide was obtained. Next, this polymerized reaction mixture was poured into 1 kg of toluene at room temperature. Then, the resulting mixture was filtered, and the collected polyamide fine particles were washed with n-hexane, filtered again and the resulting fine particles were dried.

When the resulting fine particles are observed by a scanning type electron microscope, they were true sphere shape and their particle size distribution was 10 to 80 µm. A relative viscosity of the fine particles was 2.08.

Example 2

In a 200 ml reaction vessel equipped with a condenser and a stirring apparatus were charged 7.5 g of powdery 12-aminododecanoic acid, and 100 g of polydimethyldiloxane (available from Toray Dow Corning Co., SH200-10000cs, trade name), and the mixture was stirred at room temperature to disperse the powdery 12-aminododecanoic acid powder well. Then, under nitrogen atmosphere and stirring, the mixture was heated at 220° C. for 2 hours to polymerize 12-aminododecanoic acid whereby a sufficiently dispersed polyamide was obtained. Next, this polymerized reaction mixture was poured into 1 kg of xylene at room temperature. Then, the resulting mixture was filtered, and the collected polyamide fine particles were washed with methanol, filtered again and the resulting fine particles were dried.

When the resulting fine particles are observed by a scanning type electron microscope, they were true sphere shape and their particle size distribution was 10 to 25 µm. A relative viscosity of the fine particles was 2.06.

Example 3

In a 200 ml reaction vessel equipped with a condenser and a stirring apparatus were charged 5 g of powdery 12-aminododecanoic acid, and 100 g of polydimethyldiloxane (available from Toray Dow Corning Co., SH200-10000cs, trade name), and the mixture was stirred at room temperature to disperse the powdery 12-aminododecanoic acid powder well. Then, under nitrogen atmosphere and stirring, the mixture was heated at 195° C. for 2 hours to polymerize 12-aminododecanoic acid whereby a sufficiently dispersed polyamide was obtained. Next, this polymerized reaction mixture was poured into 1 kg of xylene at room temperature. Then, the resulting mixture was filtered, and the collected polyamide fine particles were washed with methanol, filtered again and the resulting fine particles were dried.

When the resulting fine particles are observed by a scanning type electron microscope, they were true sphere shape and their particle size distribution was 3 to 27 µm. A relative viscosity of the fine particles was 1.70.

Example 4

In a 200 ml reaction vessel equipped with a condenser and a stirring apparatus were charged 5 g of powdery 12-aminododecanoic acid, and 100 g of polydimethyldiloxane (available from Toray Dow Corning Co., SH200-10000cs, trade name), and the mixture was stirred at room temperature to disperse the powdery 12-aminododecanoic acid powder well. Then, under nitrogen atmosphere and stirring, the mixture was heated at 220° C. for 2 hours to polymerize 12-aminododecanoic acid whereby a sufficiently dispersed polyamide was obtained. Next, this polymerized reaction mixture was poured into 1 kg of xylene at room temperature. Then, the resulting mixture was filtered, and the collected polyamide fine particles were washed with methanol, filtered again and the resulting fine particles were dried.

When the resulting fine particles are observed by a scanning type electron microscope, they were true sphere shape and their particle size distribution was 3 to 30 µm. A relative viscosity of the fine particles was 2.09.

Example 5

In a 200 ml reaction vessel equipped with a condenser and a stirring apparatus were charged 5 g of powdery 12-aminododecanoic acid, and 100 g of polydimethyldiloxane (available from Toray Dow Corning Co., SH200-10000cs, trade name), and the mixture was stirred at room temperature to disperse the powdery 12-aminododecanoic acid powder well. Then, under nitrogen atmosphere and stirring, the mixture was heated at 220° C. for 2 hours to polymerize 12-aminododecanoic acid whereby a sufficiently dispersed polyamide was obtained. Next, this polymerized reaction mixture was poured into 1 kg of xylene at room temperature. Then, the resulting mixture was filtered, and the collected polyamide fine particles were washed with methanol, filtered again and the resulting fine particles were dried.

When the resulting fine particles are observed by a scanning type electron microscope, they were true sphere shape and their particle size distribution was 3 to 80 µm. A relative viscosity of the fine particles was 2.10.

Example 6

In a 200 ml reaction vessel equipped with a condenser and a stirring apparatus were charged 5.3 g of powdery 12-aminododecanoic acid, and 111 g of polydimethyldiloxane (available from Toray Dow Corning Co., SH200-10000cs, trade name), and the mixture was stirred at room temperature to disperse the powdery 12-aminododecanoic acid powder well. Then, under nitrogen atmosphere and stirring, the mixture was heated at 200° C. for 1 hours to polymerize 12-aminododecanoic acid whereby a sufficiently dispersed polyamide was obtained. Next, this polymerized reaction mixture was poured into 1 kg of xylene at room temperature. Then, the resulting mixture was filtered, and the collected polyamide fine particles were washed with methanol, filtered again and the resulting fine particles were dried.

When the resulting fine particles are observed by a scanning type electron microscope, they were true sphere shape and their particle size distribution was 5 to 15 µm. A relative viscosity of the fine particles was 1.60.

Example 7

In a 200 ml reaction vessel equipped with a condenser and a stirring apparatus were charged 5 g of powdery 12-aminododecanoic acid, and 95 g of polydimethyldiloxane (available from Toray Dow Corning Co., SH200-10000cs, trade name), and the mixture was stirred at room temperature to disperse the powdery 12-aminododecanoic acid powder well. Then, under nitrogen atmosphere and stirring, the mixture was heated at 175° C. for 0.5 hour to polymerize 12-aminododecanoic acid whereby a sufficiently dispersed polyamide. Next, this polymerized reaction mixture was poured into 1 kg of xylene at room temperature. Then, the resulting mixture was filtered, and the collected polyamide fine particles were washed with methanol, filtered again and the resulting fine particles were dried.

When the resulting fine particles are observed by a scanning type electron microscope, they were true sphere shape and their particle size distribution was 1 to 9 μm. A relative viscosity of the fine particles was 1.49.

According to the present invention, spherical polyamide fine particles can be directly formed from a monomer with good efficiency and high productivity. Also, the resulting fine particles are uniform and powder state so that fluidity as powder is excellent and it can be suitably used as a base material for cosmetics, shaving foam, body shampoo and a surfactant of artificial leathers.

What is claimed is:

1. A process for preparing a spherical polyamide having an average particle size of about 100 μm or less, without post-treatment of said polyamide, which consists essentially of:

a) dispersing a polyamide monomer in a liquid polymerization medium to form a mixture which is inactive and chemically stable at the polymerization temperature of the polyamide;

b) heating the mixture, while stirring, to the polymerization temperature, wherein said polymerization temperature is greater than the melting temperature of the polyamide monomer and the melting temperature of the formed polyamide and lower than the deterioration temperature of the polymerization medium, to thereby form fine particles of the polyamide in the polymerization reaction medium;

c) cooling the polymerization reaction mixture to a temperature wherein the fine spherical polyamide particles solidify and recovering the fine spherical particles of the polyamide, having an average particle size of 100 μm or less.

2. The process according to claim 1, wherein the resulting polymerization reaction mixture is cooled below the melting temperature of the polyamide to obtain the fine spherical particles having an average particle size of about 100 μm or less.

3. The process according to claim 1, wherein an emulsifying apparatus is used in the polymerization process under heating.

4. The process according to claim 1 wherein the polyamide monomer to be used is as least one selected from the group consisting of aminocarboxylic acids having 4 to 12 carbon atoms.

5. The process according to claim 4, wherein the aminocarboxylic acid is at least one selected from the group consisting of 4-aminobutanoic acid, 6-aminocaproic acid, 11-aminoundecanoic acid and 12-aminododecanoic acid.

6. The process according to claim 1, wherein the polymerization medium is a silicone oil.

7. The process according to claim 6, wherein the polymerization medium is a silicone oil having a viscosity at 25° C. of 100 cps or more.

* * * * *